US012649497B2

(12) United States Patent
Doell et al.

(10) Patent No.: US 12,649,497 B2
(45) Date of Patent: Jun. 9, 2026

(54) SYSTEM CONSISTING OF A MOTOR VEHICLE AND A MOBILE ELECTRONIC DEVICE FOR A DRIVE OPERATION WHICH IS AUTOMATED UNDER CERTAIN CONDITIONS, AND OPERATING METHOD

(71) Applicant: Bayerische Motoren Werke Aktiengesellschaft, Munich (DE)

(72) Inventors: Mathias Doell, Unterschleissheim (DE); Ivo Nikolov, Munich (DE); Stefan Pilz, Putzbrunn (DE); Christoph Resch, Obernzell (DE); Jakob Reuter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 319 days.

(21) Appl. No.: 18/287,618

(22) PCT Filed: Apr. 19, 2022

(86) PCT No.: PCT/EP2022/060229
§ 371 (c)(1),
(2) Date: Oct. 19, 2023

(87) PCT Pub. No.: WO2022/223511
PCT Pub. Date: Oct. 27, 2022

(65) Prior Publication Data
US 2024/0217560 A1     Jul. 4, 2024

(30) Foreign Application Priority Data
Apr. 20, 2021    (DE) ..................... 10 2021 110 012.7

(51) Int. Cl.
*B60W 60/00*        (2020.01)
*B60K 35/22*        (2024.01)
(Continued)

(52) U.S. Cl.
CPC ......... *B60W 60/0053* (2020.02); *B60K 35/22* (2024.01); *B60K 35/81* (2024.01);
(Continued)

(58) Field of Classification Search
None
See application file for complete search history.

(56) References Cited

U.S. PATENT DOCUMENTS 8,874,162 B2    10/2014  Schrader et al.
10,506,091 B2    12/2019  Tibbitts et al.
(Continued)

FOREIGN PATENT DOCUMENTS

DE    10 2012 201 513 A1    8/2013
DE    10 2014 106 241 A1    5/2015
(Continued)

OTHER PUBLICATIONS

International Search Report (PCT/ISA/210) issued in PCT Application No. PCT/EP2022/060229 dated Aug. 4, 2022 with English translation (6 pages).
(Continued)

*Primary Examiner* — James J Lee
*Assistant Examiner* — Tawri M Mcandrews
(74) *Attorney, Agent, or Firm* — Crowell & Moring LLP

(57)        ABSTRACT

A system including a motor vehicle and a mobile electronic device having a display device which can be used by a vehicle occupant. The motor vehicle has an assistance system for a drive operation which is automated under certain conditions. The motor vehicle is designed to transmit a specified control signal to the mobile device in response to detection of a drive situation to be managed in a non-autonomous manner. The mobile device is configured to receive and process control signals so as to be adapted to the motor vehicle and to output a transfer request, by means of
(Continued)

which the vehicle occupant is requested to assume the guidance of the vehicle, in an assured manner by means of the display device in response to receiving the control signal regardless of the user configuration of the device.

18 Claims, 1 Drawing Sheet

(51) Int. Cl.
*B60K 35/81* (2024.01)
*B60W 50/14* (2020.01)

(52) U.S. Cl.
CPC ....... *B60W 50/14* (2013.01); *B60W 2050/146* (2013.01); *B60W 2540/00* (2013.01); *B60W 2556/45* (2020.02)

(56) References Cited

U.S. PATENT DOCUMENTS

| | | | | |
|---|---|---|---|---|
| 2015/0015386 | A1 | 1/2015 | Langenhan | |
| 2017/0097857 | A1* | 4/2017 | Yang | G06F 11/3024 |
| 2017/0282936 | A1 | 10/2017 | Wagner et al. | |
| 2017/0341512 | A1 | 11/2017 | Nordbruch | |
| 2018/0141570 | A1 | 5/2018 | Kimura | |
| 2019/0166635 | A1* | 5/2019 | McColgan | H04W 12/50 |
| 2020/0322476 | A1* | 10/2020 | Cohen | H04W 4/50 |
| 2021/0188289 | A1* | 6/2021 | Oba | G08G 1/16 |

FOREIGN PATENT DOCUMENTS

| | | |
|---|---|---|
| DE | 10 2014 214 078 A1 | 1/2016 |
| DE | 10 2014 225 562 A1 | 6/2016 |
| DE | 10 2016 004 042 A1 | 10/2017 |
| DE | 10 2017 007 275 A1 | 4/2018 |
| DE | 10 2017 200 841 A1 | 7/2018 |
| DE | 10 2017 215 405 A1 | 3/2019 |
| DE | 10 2018 209 039 A1 | 12/2019 |
| DE | 10 2018 132 868 A1 | 6/2020 |
| DE | 10 2019 105 546 A1 | 9/2020 |
| DE | 10 2017 125 730 B4 | 12/2020 |
| KR | 10-2021-0002070 A | 1/2021 |

OTHER PUBLICATIONS

German-language Written Opinion (PCT/ISA/237) issued in PCT Application No. PCT/EP2022/060229 dated Aug. 4, 2022 with English translation (12 pages).
German Search Report issued in German Application No. 10 2021 110 012.7 dated Jan. 25, 2022 with partial English translation (12 pages).
"(R) Taxonomy and Definitions for Terms Related to Driving Automation Systems for On-C4 Road Motor Vehicles", Surface Vehicle Recommended Practice, SAE (Society of Automotive Engineering) International, J3016™, Sep. 2016, pp. 1-30 (30 pages).

\* cited by examiner

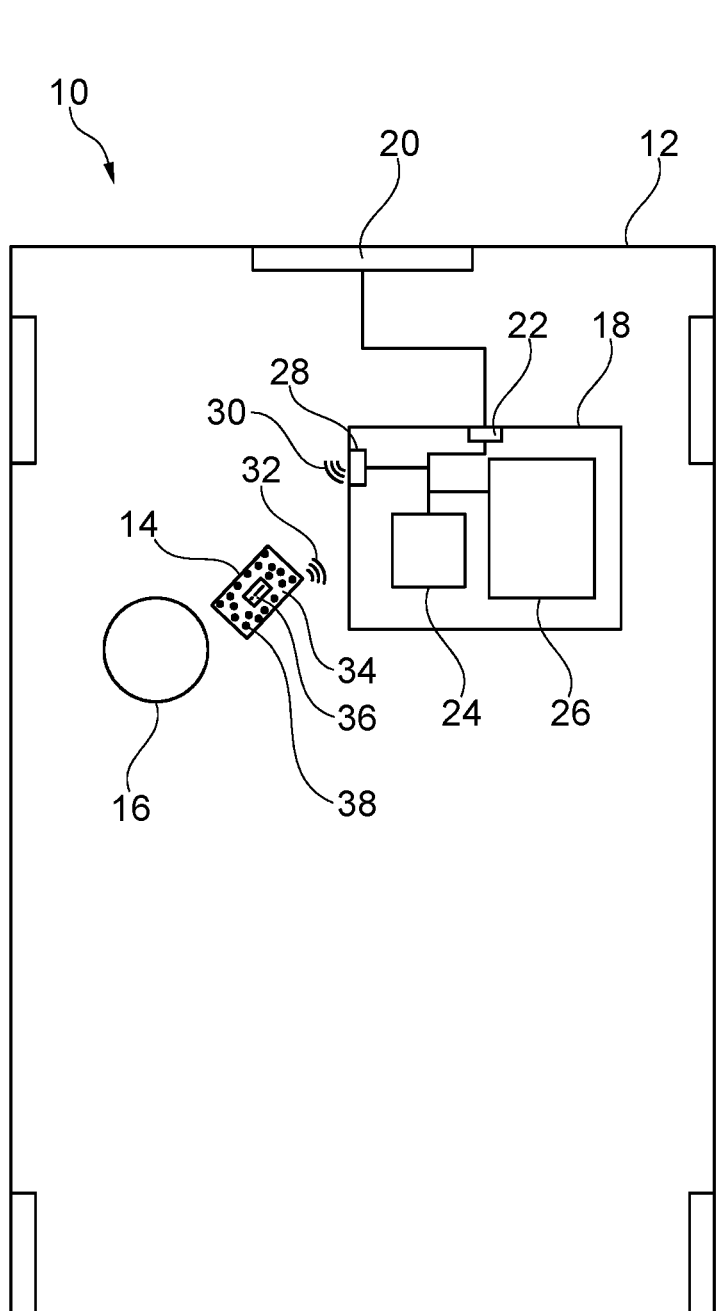

SYSTEM CONSISTING OF A MOTOR VEHICLE AND A MOBILE ELECTRONIC DEVICE FOR A DRIVE OPERATION WHICH IS AUTOMATED UNDER CERTAIN CONDITIONS, AND OPERATING METHOD

BACKGROUND AND SUMMARY

The present invention relates to a system consisting of a motor vehicle which is configured for conditionally automated driving operation and a mobile electronic device which is coordinated with this vehicle. Furthermore, the invention relates to a method for operating such a system.

Assistance systems, which are ever increasingly automating driving operation or a driving task of motor vehicles, and various mobile electronic devices, such as, for example, smartphones, tablet computers and the like, are currently becoming more and more widespread. This results in situations in which a motor vehicle or its assistance systems are not yet capable of controlling the motor vehicle completely autonomously and at the same time a driver of the motor vehicle is distracted from control of the motor vehicle or the surrounding traffic scenario, whether by the use of an electronic device or other influences. This can lead or contribute to a significant impairment to road traffic safety.

For example, DE 10 2017 125 730 B4 describes a vehicle system which comprises a warning unit. This warning unit can output a light stimulus to a driver via a head-up display if a change in a traffic environment ahead of the vehicle is detected while the vehicle is performing autonomous driving. If it is determined that the driver meanwhile is not looking ahead, a vibration or a sound can be output as a first warning. If it is determined that the driver is not holding a steering wheel of the vehicle before a first stipulated time following the start of the first warning has elapsed, a second warning can be issued. This second warning can comprise the vibrations and the sound. This should create an opportunity to be able to motivate the driver to concentrate on driving according to their situation.

The problem of the distraction caused by use of mobile electronic devices is discussed, for example, in U.S. Pat. No. 10,506,091 B2. This document describes a system for controlling mobile services which is configured to determine whether a vehicle is being controlled by a driver. In this case, there is also provision in the vehicle interior for a detection system for detecting a controllable mobile device which can move independently of the detection system. Furthermore, there is provision for computer-aided equipment for determining the identity of the vehicle driver. In this case, this equipment uses an input which is representative of a vehicle identification, of a characteristic of the vehicle and at least two further features. These further features comprise a position of the vehicle, a speed of the vehicle, a speed of the mobile device, an acceleration of the vehicle, an acceleration of the mobile device, a respectively associated time stamp, a direction of the vehicle and a direction of the mobile device. This is intended to solve problems of previous approaches.

A further problem is that, while a vehicle is travelling, although use of a mobile electronic device by a driver can be problematic, use of the device by a passenger is not problematic and should not be restricted. To this end, U.S. Pat. No. 8,874,162 B2 proposes a mobile device which comprises a display device and a data processing system. This is intended to implement a driving safety service. This service is configured to determine whether a user of the mobile device is driving the vehicle or is a passenger. In response to determining that the user is driving the vehicle, a driving safety mode of the mobile device is activated in order to change the display device to a driving mode lock screen without input authentication for the access data. Functions of the mobile device are deactivated while the driving safety mode is activated.

An object of the present invention is to allow safe, conditionally automated operation of a motor vehicle.

This object is achieved according to the invention by the subject matter of the present disclosure. Possible configurations and developments of the present invention are also disclosed in the description and in the drawing.

The system according to the invention comprises a motor vehicle and a mobile electronic device. The latter has a display device, that is to say in particular a screen, and is able to be used in the motor vehicle by an occupant of this motor vehicle. The mobile electronic device can for example be a smartphone, a tablet computer, a laptop computer, an e-book reader and/or the like.

The motor vehicle has an assistance system for controlling the motor vehicle in a conditionally automated manner. In other words, the motor vehicle or its assistance system is thus configured for conditionally automated driving operation, for instance in accordance with SAE J3016 Level 3. In other words, the motor vehicle can at least sometimes drive autonomously without the occupant having to continually observe a respective driving situation and having to be ready to instantaneously take over control, that is to say steering or monitoring, of the motor vehicle. The motor vehicle or its assistance system is further configured to automatically recognize driving situations which cannot be handled autonomously. Driving situations which cannot be handled autonomously are in this case situations which require manual control of the motor vehicle by a human operator, in particular the occupant.

The motor vehicle further has a transmission or communication device and is configured to automatically transmit a predefined control signal to the mobile electronic device in response to such recognition of a driving situation which cannot be handled autonomously. To this end, the transmission device can have in particular a corresponding radio module, Bluetooth module or WLAN module or the like, that is to say it can in particular be configured to transmit the control signal wirelessly.

According to the invention, the mobile electronic device is technically coordinated with the motor vehicle or its assistance system and/or transmission device so as to receive and process the control signal. To this end, the mobile electronic device can for example have a receiving device, that is to say, for instance, an antenna, which is coordinated with the assistance system or the transmission device of the motor vehicle in terms of a type and frequency of the control signal. In other words, the transmission device of the motor vehicle and a corresponding receiving device of the mobile electronic device can be configured for the same transmission or communication technology. The mobile electronic device is further configured so as, in response to receiving the control signal, to output in each case a predefined takeover request (TOR) via its display device without fail regardless of a user configuration of the mobile electronic device. In this case, the takeover request is designed to request that the occupant take over control of the vehicle, that is to say manual steering or monitoring of the motor vehicle. The takeover request can in particular be output as a visual or graphical notification, that is to say it can comprise for example at least one symbol, a predefined block of text, an animation and/or the like.

Here, the user configuration of the mobile electronic device means or encompasses for example settings made or able to be made by a user or operator of the mobile electronic device, in particular the occupant of the motor vehicle, a set of software installed on the mobile electronic device by the user, activation or deactivation of the display device during operation of the mobile electronic device and/or the like.

The coordination of the motor vehicle and the mobile electronic device with one another can for example be performed or ensured by a manufacturer of the motor vehicle and/or of the mobile electronic device. Provision can thus in particular be made for the mobile electronic device to be enabled for the motor vehicle or for use in the motor vehicle during conditionally automated driving operation of the motor vehicle if this coordination exists or was carried out.

As already indicated, during conditionally automated driving operation of the motor vehicle, the occupant, as the driver, does not have to continually direct their attention to the driving task or operation of the motor vehicle. Additionally, as already indicated in the introduction, due to mobile electronic devices being widespread and becoming more and more widespread, there is a significant likelihood in such situations nowadays that it must be expected that the occupant will be using a mobile electronic device, for example for work or for entertainment, during such phases of automated driving operation. Conventional motor vehicles configured for conditionally automated driving operation can output a takeover request for example via a display device on board the vehicle, for example an instrument cluster or a head-up display. In this case, however, the problem arises that takeover requests output in such a way are not reliably perceived or recognized by the occupant if they are using a mobile electronic device, since the field of view of the occupant in such cases is typically directed toward the mobile electronic device and this mobile electronic device is additionally often held in a position which also makes peripheral perception of the takeover request difficult. What makes it even more difficult is that nowadays there is an incalculably large variety of different mobile electronic devices, which differ from each other in terms of their hardware, their software configuration and their user settings. It would thus be an unaccomplishable task in practice to ensure, for all the different mobile electronic devices in all the possible configurations, that the takeover request is output thereto safely, reliably and in the intended manner.

These problems are addressed by the present invention. By virtue of the fact that the takeover request is output on the mobile electronic device, it can be ensured in a particularly reliable manner that the occupant does not overlook the takeover request when they are using the mobile electronic device. In addition, this can also be achieved for situations in which the occupant is using headphones for example or does not hear an audible takeover request output by the vehicle due to media playback and/or if the occupant is hard of hearing, for example. By virtue of the fact that the mobile electronic device coordinated with the vehicle is used for outputting the takeover request in the present case, it can additionally be ensured in a particularly reliable and robust manner that the takeover request is actually output, and in the intended way. This also makes it possible to significantly increase the likelihood that the occupant does not overlook the takeover request, for example compared to using a mobile device which is not specifically coordinated with the motor vehicle for this functionality.

In addition, the present invention can ensure that the occupant, as the user of the mobile electronic device, cannot prevent the mobile electronic device from automatically outputting the takeover request prompted by the control signal, for example by simply switching off a corresponding function on the mobile electronic device. Overall, the takeover request can thus actually reach the occupant, that is to say be perceived by the occupant, and this can be ensured, in a particularly reliable manner. It is thus possible to increase the likelihood of the occupant taking over control of the motor vehicle in a timely and reliable manner in the respective situation which cannot be handled autonomously. This can contribute directly and indirectly to improved road traffic safety, for example since there is a higher likelihood that the motor vehicle will not have to perform an emergency stop maneuver due to the occupant not taking over control of the vehicle, and the acceptance and prevalence of at least conditionally automated motor vehicles can be promoted.

The motor vehicle or its assistance device can in particular be configured so as, in addition to transmitting the control signal to the mobile electronic device, to output in each case a corresponding takeover request from the vehicle via an output device of the motor vehicle, for example in the form of a visual or graphical, audible and/or haptic notification.

In one possible configuration of the present invention, the mobile electronic device is configured so as, at least in response to receiving the control signal, to perform a function, that is to say for example a corresponding software process, for processing the control signal and for outputting the takeover request with the highest priority. In other words, this function or this software process can always, that is to say continually, be performed with the highest priority or, in response to receiving the control signal, automatically be set in each case to the highest priority, at least until the takeover request has been output or has been displayed for at least a predefined minimum time, for example. Maximum resources or computing time of the mobile electronic device can thus be allocated to the corresponding function or the corresponding software process. As a result, it can be ensured in a particularly reliable manner, regardless of other software or applications running or being performed when the control signal is received, that the takeover request is output reliably and as instantly as possible. This can further improve the likelihood of the occupant taking over control of the vehicle as quickly as possible and can therefore likewise contribute to improved safety when using the system according to the invention, when using conditionally automated driving operation and in terms of road safety in general. Performing the corresponding function or the corresponding software process with the highest priority additionally makes it possible, for example, to prevent this performance and ultimately the output of the takeover request from being slowed down, delayed, or blocked or interrupted by other processes. In particular, the mobile electronic device can have a locking function in order to lock this priority or priority allocation so that the occupant is unable to adjust or change the priority with which the corresponding function or the corresponding software process is performed.

In a further possible configuration of the present invention, the mobile electronic device has a locking function which prevents a user or the occupant from installing software which may impede output of the takeover request—and possibly reception and processing of the control signal—and from deactivating or deleting the function for receiving and processing the control signal and for outputting the takeover request. This locking function can for example be realized or implemented as hardware and/or as software. In other words, the mobile electronic device thus has restricted installation, adjustment or setting options for the user or occupant. For example, the locking function can ensure that only software that is recorded in a predefined whitelist, that is to say an authorized list, can be installed on the mobile electronic device by the user or occupant, while blocking other software from being installed. In order to realize or support the locking function, the corresponding function or a corresponding software process can for example be concealed or hidden from a user of the mobile electronic device or protected against changes for example by a permanently predefined rights management or rights requirement. The locking function can likewise be realized or supported by virtue of the function for processing the control signal and for outputting the takeover request being implemented or performed as hardware, that is to say realized or implemented in the form of a hardware circuit, in a hardware module that is separate from the other functions of the mobile electronic device, by virtue of a corresponding software component being stored and/or performed in a separate or protected, for example write-protected, memory area or memory module of the mobile electronic device, and/or the like. In this way, the takeover request can actually be output in the intended way and be protected against manipulations by the user, or this can be ensured, in a particularly reliable manner. The advantages described for the present invention can therefore be maintained in a particularly reliable and continual manner.

In a further possible configuration of the present invention, the motor vehicle is configured to automatically detect the mobile electronic device and to allow the motor vehicle to be controlled in a conditionally automated manner, that is to say in Level 3 operation, only if the mobile electronic device is successfully detected in the motor vehicle. In other words, the motor vehicle or the system according to the invention is thus configured to only offer or allow the occupant the option or function for activating or using conditionally automated driving operation if, or for as long as, the mobile electronic device is detected in the motor vehicle. Otherwise, that is to say if detection of the mobile electronic device is not successful or fails, the option or function to control the motor vehicle in a conditionally automated manner can conversely be automatically locked by the motor vehicle, its assistance system or the system according to the invention. The configuration of the present invention proposed here allows safety during conditionally automated driving operation of the motor vehicle to be improved in a particularly reliable manner.

In one possible development of the present invention, the motor vehicle is configured so as, in the event of the mobile electronic device being successfully detected, to verify the functionality and operational readiness of this mobile electronic device for outputting the takeover request and only then, that is to say only in the case of or following successful verification, to allow or enable the motor vehicle to be controlled in a conditionally automated manner, that is to say to allow or enable conditionally automated driving operation of the motor vehicle. Up until the successful detection and verification, conditionally automated driving operation of the motor vehicle can be locked by this vehicle or by its assistance device. The verification of the functionality and operational readiness of the mobile electronic device can for example be carried out or confirmed by an automatically output check signal or test signal, automatic activation of a predefined self-test routine or possibly on the basis of an appropriate response signal transmitted from the mobile electronic device to the motor vehicle. The configuration of the present invention proposed here makes it possible to ensure in an even more reliable manner that not only is the mobile electronic device present in the motor vehicle but that it can actually perform its intended function for outputting the takeover request. It is therefore possible to recognize or detect, for example, errors or a manipulation of the mobile electronic device that affects this function. Overall, it is thus possible to further improve safety when using or applying conditionally automated driving operation of the motor vehicle.

In one possible development of the present invention, the motor vehicle is configured to verify the mobile electronic device by retrieving a certificate which is stored on the latter and which is associated with the mobile electronic device and/or the software state thereof with regard to the functionality for processing the control signal and for outputting the takeover request, and by comparing this certificate with a predefined target certificate. This target certificate can be stored for example in the vehicle, that is to say in a data memory of the motor vehicle that is inaccessible in particular to the occupant. In addition or alternatively, the target certificate can be stored for example in a backend or cloud server, that is to say in a data processing device that is outside the vehicle. The motor vehicle can then automatically make contact with the latter via a wireless data connection, for example a mobile radio connection, in order to retrieve the target certificate or to compare the certificate with the target certificate. The association of the certificate with the electronic device and/or the software state thereof can for example mean that a change in the hardware, for example if components or parts of the mobile electronic device are replaced or removed, and/or a change in software of the mobile electronic device, which software manages or implements reception and processing of the control signal and output of the takeover request, lead/leads to a change and thus to the certificate becoming invalid. To this end, the certificate can for example comprise a checksum or a hash value or the like which is automatically regularly regenerated. For example, such a checksum or such a hash value for a request signal transmitted from the motor vehicle and received by the mobile electronic device in order to request the certificate from the mobile electronic device can be automatically recalculated. However, the certificate can also for example be generated as part of the coordination or an initial inspection and approval of the mobile electronic device or of the system according to the invention by the manufacturer and stored in an in particular protected, for example write-protected, memory area or memory module of the mobile electronic device. Such a certificate and the comparison, as proposed here, with the target certificate which is inaccessible to the mobile electronic device and/or the occupant makes it possible to ensure that the mobile electronic device meets corresponding requirements for output of the takeover request according to the invention. This makes it possible to prevent, for example, another device from falsely impersonating the mobile electronic device which is coordinated with the motor vehicle and thus canceling output of the takeover request according to the invention by the mobile electronic device. In order to further improve security, the certificate can for example be a secret key, in particular one that is automatically generated, or comprise such a secret key, and/or be cryptographically encrypted or be transmitted to the motor vehicle in an encrypted manner.

In a further possible configuration of the present invention, the motor vehicle is configured to transmit an enable control signal to the mobile electronic device at least once per cycle of operation of the motor vehicle. The mobile electronic device is then configured so as, in response to receiving this enable control signal, to output in each case an enable request to the occupant via the display device of the mobile electronic device and, if this enable request is confirmed by the occupant, to transmit a corresponding confirmation signal to the motor vehicle. The motor vehicle is then further configured to allow or enable the vehicle to be controlled in a conditionally automated manner for the respective cycle of operation only after receiving the respective confirmation signal. Until the respective reception of the confirmation signal, conditionally automated driving operation can be locked by the motor vehicle or its assistance system. A cycle of operation of the motor vehicle in the present sense can in each case begin with the motor vehicle being started up and end with the motor vehicle being switched off. A cycle of operation can thus correspond for example to a journey from a starting point to a destination of the motor vehicle. The configuration of the present invention proposed here makes it possible to ensure in a particularly reliable manner that not only is the mobile electronic device located in the motor vehicle and switched on but that the occupant also has it to hand. In addition, the occupant can thus be effectively informed that, during conditionally automated driving operation of the motor vehicle, they may only use this mobile electronic device which is coordinated with the motor vehicle. It is thus possible to increase the likelihood of the occupant actually using this mobile electronic device and not, for instance, another device during conditionally automated driving operation of the motor vehicle, which, by virtue of the mechanism according to the invention of outputting the takeover request to the mobile electronic device, can contribute to improved safety. The system according to the invention can in particular be configured here to use the same mechanism for transmission of the enable control signal and output of the enable request as for transmission of the control signal and output of the takeover request. As a result, a check or verification of the functionality, that is to say the correct functioning of the mobile electronic device for outputting the takeover request, can be realized at the same time even before conditionally automated driving operation of the motor vehicle has begun, which can likewise be beneficial in terms of safety.

In a further possible configuration of the present invention, the mobile electronic device is configured so as, in response to receiving the control signal, to in each case automatically interrupt other application software or applications which is/are running on the mobile electronic device, that is to say which is/are being performed on the mobile electronic device, in order to output the takeover request. The mobile device can thus for example be configured so as, when prompted by the control signal, to interrupt a respectively current media playback, at least until the takeover request has been successfully output or has been displayed for at least a predefined minimum time. In particular, the mobile electronic device can be configured to output the takeover request such that it fills the screen, meaning that the display device then outputs, that is to say displays, no contents other than the takeover request or displays such other contents at least only in the background and/or such that their visibility is reduced. The latter can for example mean that the mobile electronic device is configured to cover, in a predefined way, areas of the display device that are not taken up by the actual takeover request, to superimpose a predefined pattern thereon and/or the like. The configuration of the present invention proposed here makes it possible to improve the conciseness and visibility of the takeover request. As a result, the takeover request can actually reach the occupant, that is to say be perceived or noticed by them, in a particularly reliable manner.

In a further possible configuration of the present invention, the motor vehicle is configured so as, while the vehicle is being controlled in an at least conditionally automated manner, that is to say, for instance, during driving operation in accordance with SAE J3016 Level 3 or Level 4, to recognize predefined or automatically learnt situations which have at least a predefined likelihood of preceding a driving situation which cannot be handled autonomously and/or can adversely affect the comfort of the occupant. Such situations can for example comprise or relate to the motor vehicle approaching a storm, imminent unusually heavy braking or acceleration of the motor vehicle, imminent driving around an unusually tight bend, imminent occurrence of an unusually large transverse acceleration or of unusually large transverse forces, entry into a particular environment, such as, for instance, an inner-city area, and/or the like. Corresponding situations or parameters which are characteristic of such situations can be stored for example in a data memory of the motor vehicle, in particular by its assistance system. Such situations or parameters can likewise be automatically learnt, for example by the assistance system, during operation of the motor vehicle. To this end, the motor vehicle, in particular its assistance system, can comprise for example a correspondingly trained or configured machine-learning device, that is to say, for instance, an artificial deep neural network or the like.

In the configuration of the present invention that is proposed here, the motor vehicle is further configured so as, in response to recognition of such a situation, to automatically transmit a corresponding notification control signal to the mobile electronic device. The mobile electronic device is then configured so as, in response to receiving the notification control signal, to output a corresponding notification about the recognized situation via the display device. Such a notification makes it possible for the occupant, if they are using the mobile electronic device, to be notified about the respective situation or to be prepared for it in advance. As a result, firstly, the comfort of the occupant can be improved, for example by virtue of the fact that the likelihood of the occupant being startled by the respective situation, spilling a drink and/or the like is reduced. Secondly, the output of the notification that is proposed here can contribute to further improved safety by virtue of the fact that the occupant is made aware of the respective situation in a particularly timely manner and it is consequently possible to reduce the time it takes for the occupant to react to a subsequent takeover request, that is to say a takeover time required by the occupant to safely take over control of the vehicle. By virtue of the fact that a corresponding notification is only output in or before situations which have an increased likelihood, that is to say for example an above-average likelihood or at least a likelihood corresponding to a predefined minimum likelihood, of an imminently subsequent or resulting takeover request, the number of ultimately unnecessary notifications of this kind can be minimized in order to avoid distracting or annoying the occupant ultimately unnecessarily.

A further aspect of the present invention is a method for operating a vehicle system which comprises a motor vehicle which is configured for conditionally automated driving operation and a mobile electronic device which is coordinated with this vehicle. The mobile electronic device in this case is a device which is able to be used in the motor vehicle by an occupant of the motor vehicle and has a display device.

In one method step of the method according to the invention, during conditionally automated driving operation of the motor vehicle, a corresponding assistance system of the motor vehicle is used to automatically recognize a driving situation which cannot be handled autonomously by the motor vehicle.

In a further method step of the method according to the invention, a predefined control signal is automatically transmitted to the mobile electronic device. This can for example be carried out by a transmission device of the motor vehicle, which transmission device is connected to the assistance system or is configured as part of the assistance system.

In a further method step of the method according to the invention, the control signal is received and processed by way of the mobile electronic device. In a further method step of the method according to the invention, a takeover request, by way of which the occupant is requested to take over control of the motor vehicle, is subsequently output via the display device of the mobile electronic device without fail regardless of a user configuration of the mobile electronic device.

The method according to the invention can thus in particular comprise those method steps, measures or processes which are described in combination with the system according to the invention. In other words, the system according to the invention can be in particular configured to automatically perform the method according to the invention. Further method steps, measures or processes described or mentioned in combination with the system according to the invention can for example form further, possibly optional, method steps of the method according to the invention.

The method according to the invention or the method steps thereof can for example be implemented by at least one computer program for the system according to the invention, that is to say the motor vehicle of this system, in particular the assistance system of the motor vehicle, and the mobile electronic device of this system. Such a computer program can then be stored in a computer-readable data memory or wholly or partly in a plurality of computer-readable data memories in each case. Such a computer program and such a data memory can for their part be separate aspects of the present invention.

Further features of the invention can be gathered from the claims, the FIGURES and the description of the FIGURES. The features and combinations of features mentioned above in the description and the features and combinations of features shown below in the description of the FIGURES and/or in the FIGURES themselves can be used not only in the respectively specified combination but also in other combinations or on their own without departing from the scope of the invention.

BRIEF DESCRIPTION OF THE DRAWING

FIG. 1 shows a partial schematic illustration of a motor vehicle and of a mobile electronic device interacting therewith for conditionally automated operation of the motor vehicle.

DETAILED DESCRIPTION OF THE DRAWING

FIG. 1 shows a partial schematic illustration of a system 10 which, here, comprises a motor vehicle 12 and a mobile electronic device able to be used therein, which is referred to as a mobile device 14 here. In the present case, an occupant 16, who can at least sometimes act as the driver of the motor vehicle 12, is located in the motor vehicle 12. At other times, the motor vehicle 12 can move autonomously during conditionally automated driving operation. In this case, the motor vehicle 12 can for example be controlled by a corresponding assistance system 18, with the occupant 16 being able to use the mobile device 14 in the meantime.

For conditionally automated driving operation, the motor vehicle 12 has an environment sensor system 20. Environmental data recorded by the latter can be acquired by the assistance system 18 via an input interface 22 and subsequently processed. To this end, the assistance system 18 can comprise a processor 24 and a data memory 26 connected thereto. An operating or computer program can for example be stored in the data memory 26, which program implements the processes described below and is able to be executed by the processor 24.

Before conditionally automated driving operation begins, the assistance system 18 can detect or make contact with the mobile device 14 and possibly verify the functioning or operational readiness thereof. To this end, the assistance system 18 can for example transmit a forward signal 30, indicated purely schematically here, to the mobile device 14 via a communication interface 28. In response thereto, the mobile device 14 can transmit a corresponding return signal 32 to the assistance system 18. If communication between the assistance system 18 and the mobile device 14 is successful, conditionally automated driving operation of the motor vehicle 12 can be activated or enabled.

During conditionally automated driving operation of the motor vehicle 12, this motor vehicle or its assistance system 18 can automatically recognize a situation which it actually or likely cannot handle autonomously. The assistance system 18 can then automatically transmit a corresponding forward signal 30 to the mobile device 14. In this case, the forward signal 30 can be a control signal in order to initiate a corresponding function of the mobile device 14.

The mobile device 14 here has a display device, that is to say a screen 34. In response to receiving and correspondingly processing the forward signal 30, the mobile device 14 automatically outputs a takeover request 36 on the screen 34. By way of this takeover request 36, the occupant 16 is requested to take over manual control, that is to say steering or monitoring, of the motor vehicle 12.

The mobile device 14 in this case is technically coordinated with the motor vehicle 12 or its assistance system 18 in such a way that, in response to receiving the forward signal 30, it outputs the takeover request 36 without fail regardless of a user configuration of the mobile device 14. To this end, the system 10 can be certified with regard to an appropriate compatibility of the motor vehicle 12 and of the mobile device 14 or can be authorized, for example, by the manufacturer. In addition, the mobile device 14 can for example be configured to process the received forward signal 30 with the highest priority and to output the takeover request 36 with the highest priority. To this end, the mobile device 14 can for example automatically interrupt any other running applications. The mobile device 14 can likewise be configured to always output the takeover request 36 in the foreground, that is to say such that it overlaps other applications that are being performed or contents that are being displayed on the screen 34. In addition, while displaying the takeover request 36, the mobile electronic device 14 can automatically darken an area of the screen 34 that is not being taken up by the takeover request 36 itself and/or can cover this area, for example, with a covering pattern 38 represented schematically here.

Overall, the described examples show how it is possible to realize an automated driving system which provides or implements output of so-called takeover requests to a vehicle occupant via an appropriately certified or authorized mobile electronic device, in particular one that is specific to a manufacturer or to a make of the motor vehicle 12.

LIST OF REFERENCE SIGNS

10 system
12 motor vehicle
14 mobile device
16 occupant
18 assistance system
20 environment sensor system
22 input interface
24 processor
26 data memory
28 communication interface
30 forward signal
32 return signal
34 screen
36 takeover request
38 covering pattern

The invention claimed is:

1. A system comprising:
a motor vehicle; and
a mobile electronic device, wherein the mobile electronic device comprises a display device and is configured to be used in the motor vehicle by an occupant of this motor vehicle,
wherein the motor vehicle comprises:
an assistance system configured to control the motor vehicle in a conditionally automated manner and recognize driving situations which cannot be handled autonomously; and
a transmission device;
wherein the motor vehicle is configured to automatically transmit a predefined control signal to the mobile electronic device in response to such recognition of a driving situation which cannot be handled autonomously,
wherein the mobile electronic device is coordinated with the motor vehicle so as to receive and process the control signal and is configured to, in response to receiving the control signal, output a takeover request, by way of which the occupant is requested to take over control of the vehicle, via the display device regardless of a user configuration of the mobile electronic device; and
wherein the motor vehicle is configured to:
while the vehicle is being controlled in a conditionally automated manner, recognize predefined or automatically learned situations which have at least a predefined likelihood of preceding a driving situation which cannot be handled autonomously and/or adversely affect the comfort of the occupant; and
in response to recognition of such a situation, automatically transmit a notification control signal to the mobile electronic device, the notification control signal identifying the recognized predefined or automatically learned situations; and
wherein the mobile electronic device is configured to, in response to receiving the notification control signal, output a corresponding notification about the recognized situations via the display device, the corresponding notification comprising information identifying the recognized predefined or automatically learned situations.

2. The system according to claim 1,
wherein the mobile electronic device is configured to, at least in response to receiving the control signal, perform a function for processing the control signal and for outputting the takeover request with a highest priority.

3. The system according to claim 1,
wherein the mobile electronic device is configured with a locking function which prevents a user from installing software which impedes output of the takeover request and from deactivating a function for receiving and processing the control signal and for outputting the takeover request.

4. The system according to claim 1,
wherein the motor vehicle is configured to automatically detect the mobile electronic device and to allow the motor vehicle to be controlled in a conditionally automated manner in response to successful detection of the mobile electronic device.

5. The system according to claim 4,
wherein the motor vehicle is configured to, in the event of the mobile electronic device being successfully detected, verify a functionality and operational readiness of the mobile electronic device for outputting the takeover request, and allow the motor vehicle to be controlled in a conditionally automated manner in response to verifying the functionality and operational readiness of the mobile electronic device.

6. The system according to claim 5,
wherein the motor vehicle is configured to verify the mobile electronic device by retrieving a certificate which is stored on the mobile electronic device and which is associated with the mobile electronic device and/or a software state thereof with regard to the functionality for processing the control signal and for outputting the takeover request, and by comparing the certificate with a predefined target certificate.

7. The system according to claim 1,
wherein the motor vehicle is configured to transmit an enable control signal to the mobile electronic device at least once per cycle of operation of the motor vehicle,
wherein the mobile electronic device is configured to:
in response to receiving the enable control signal, output in each case an enable request via the display device; and,
in response to receiving a confirmation of the enable request by the occupant, transmit a corresponding confirmation signal to the motor vehicle, and
wherein the motor vehicle is configured to allow the motor vehicle to be controlled in a conditionally automated manner for the respective cycle of operation in response to receiving the confirmation signal.

8. The system according to claim 1,
wherein the mobile electronic device is configured to, in response to receiving the control signal, automatically interrupt other application software including media playback that is running on the mobile electronic device in order to output the takeover request.

9. The system according to claim 8,
wherein the mobile electronic device is configured to output the takeover request such that it fills the screen.

10. A method for operating a vehicle system which comprises a motor vehicle which is configured for conditionally automated driving operation, and a mobile electronic device which is coordinated with the motor vehicle, is configured to be used in the motor vehicle by an occupant of the motor vehicle, and has a display device, wherein the method comprises:

during conditionally automated driving operation of the motor vehicle, using an assistance system of the motor vehicle to automatically recognize a driving situation which cannot be handled autonomously by the motor vehicle, the driving situation comprising recognized predefined or automatically learned situations which have at least a predefined likelihood of preceding a driving situation which cannot be handled autonomously and/or adversely affect the comfort of the occupant;

automatically transmitting a predefined control signal to the mobile electronic device, the control signal identifying the recognized predefined or automatically learned situations;

receiving and processing the control signal by the mobile electronic device; and subsequently outputting a takeover request via the display device regardless of a user configuration of the mobile electronic device, wherein the takeover request requests the occupant to take over control of the vehicle, the takeover request comprising a corresponding notification about the recognized situation via the display device, the corresponding notification comprising information identifying the recognized predefined or automatically learned situation.

11. The method according to claim 10, comprising:

in response to receiving the control signal, performing, by the mobile electronic device, a function for processing the control signal and for outputting the takeover request with a highest priority.

12. The method according to claim 10, comprising:

preventing, by the mobile electronic device, a user from installing software which impedes output of the takeover request and from deactivating a function for receiving and processing the control signal and for outputting the takeover request.

13. The method according to claim 10, comprising:

automatically detecting, by the motor vehicle, the mobile electronic device and allowing the motor vehicle to be controlled in a conditionally automated manner in response to successfully detecting the mobile electronic device.

14. The method according to claim 13, comprising:

in the event of the mobile electronic device being successfully detected, verifying, by the motor vehicle, a functionality and operational readiness of the mobile electronic device for outputting the takeover request, and allowing the motor vehicle to be controlled in a conditionally automated manner in response to verifying the functionality and operational readiness of the mobile electronic device.

15. The method according to claim 14, comprising:

verifying, by the motor vehicle, the mobile electronic device by retrieving a certificate which is stored on the mobile electronic device and which is associated with the mobile electronic device and/or a software state thereof with regard to the functionality for processing the control signal and for outputting the takeover request, and by comparing the certificate with a predefined target certificate.

16. The method according to claim 10, comprising:

transmitting, by the motor vehicle, an enable control signal to the mobile electronic device at least once per cycle of operation of the motor vehicle;

in response to receiving the enable control signal, outputting, by the mobile electronic device, in each case an enable request via the display device;

in response to receiving a confirmation of the enable request by the occupant, transmitting, by the mobile electronic device, a corresponding confirmation signal to the motor vehicle; and allowing the motor vehicle to be controlled in a conditionally automated manner for the respective cycle of operation in response to receiving the confirmation signal.

17. The method according to claim 10, comprising:

in response to receiving the control signal, automatically interrupting, by the mobile electronic device, other application software including media playback that is running on the mobile electronic device in order to output the takeover request.

18. The method according to claim 17, comprising:

outputting the takeover request such that it fills the screen.

* * * * *